Feb. 25, 1969 R. C. WRIGHT 3,429,327
SNAP ACTING DOUBLE CHECK VALVE
Filed Sept. 29, 1966
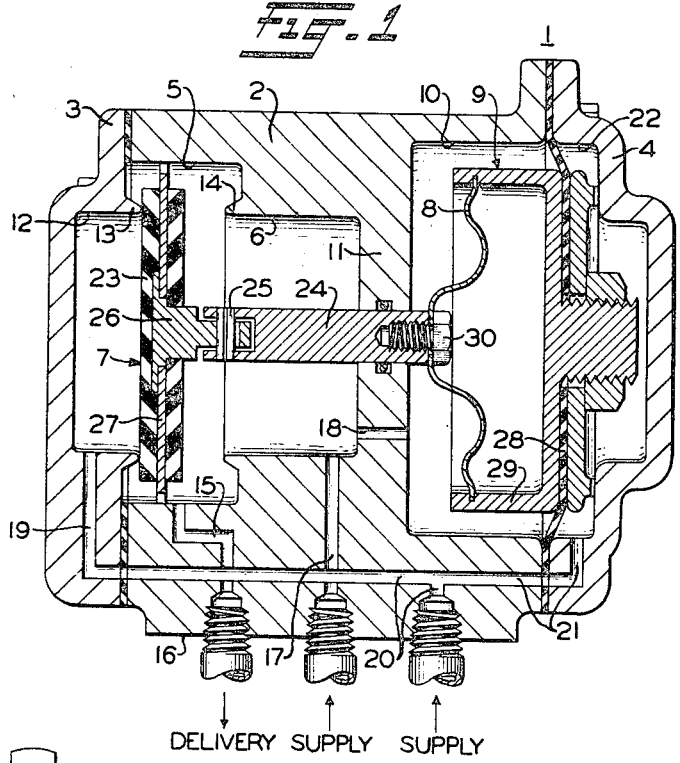
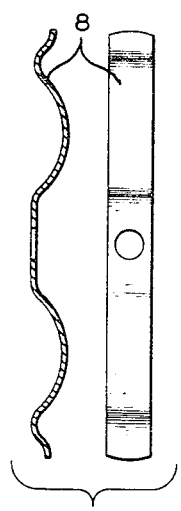
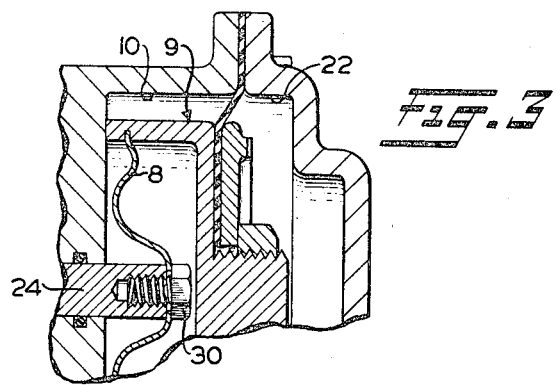
INVENTOR.
Raymond C. Wright
BY
Attorney

United States Patent Office 3,429,327
Patented Feb. 25, 1969

3,429,327
SNAP ACTING DOUBLE CHECK VALVE
Raymond C. Wright, Irwin, Pa., assignor to Westinghouse Air Brake Company, Wilmerding, Pa., a corporation of Pennsylvania
Filed Sept. 29, 1966, Ser. No. 582,812
U.S. Cl. 137—112                     5 Claims
Int. Cl. G05d *11/02*

ABSTRACT OF THE DISCLOSURE

A fluid pressure responsive double check valve device for automatically establishing a fluid pressure communication selectively between one or the other of two fluid pressure supply passages and a common delivery passage in response to a predetermined low pressure differential across a diaphragm type control piston that is subject in opposing relation to the respective pressures in the two supply passages. A double acting valve member, attached to the piston through the intermediary of a toggle type spring, is seated against one and unseated from the other of a pair of oppositely disposed annular valve seats to establish the above-mentioned fluid pressure communication upon actuation of said control piston.

Background of the invention

Presently, most double check valve devices utilize a piston or shuttle valve which is shifted from one end position in a bore to the opposite end position thereof, in response to a dominant fluid pressure acting on the piston valve from the corresponding inlet port, to connect the inlet port having the dominant pressure to a common delivery port and close off the connection between the other inlet port and the delivery port. However, should this change in the dominant supply pressure from one inlet port to the other inlet port occur at a slow rate, or should the differential of fluid pressure acting across the piston valve be relatively low, resultant movement of the piston valve will lag enough that interflow of fluid under pressure past the piston valve may occur at a rate sufficient to preclude positive sealing engagement at the low pressure end of the piston bore resulting in failure or, at best, faulty operation of the associated equipment. Various snap-acting devices have heretofore been proposed to overcome this problem of the piston valve "hanging up" by quickly and forcibly shifting it to a position in response to the dominant fluid pressure thereon. However, these snap-acting devices have not proven altogether successful in that most prior structures employ designs in which the snap-acting means imposes a lateral force on the valve member resulting in rapid eccentric wear thereof, or which require a pressure differential of such magnitude to initiate operation of the valve member that its response is delayed enough to be considered critical.

Accordingly, it is an object of the present invention to provide a fluid pressure responsive double acting check valve device characterized by a snap-acting means for imparting a prompt positive movement of the valve member upon development of only a relatively low predetermined operating fluid pressure differential irrespective of the rate at which said differential is established.

It is a further object of this invention to provide a simple, low cost double check valve device of the above character in which little or no machining is required in that a poppet type valve is utilized in place of the usual shuttle type, and wherein the snap-acting means imparts an axially applied force to the valve member in the appropriate direction without the imposition of any lateral pressure thereon to cause excessive wear and binding or to otherwise hinder its operation, but with sufficient force to insure a positive seal in response to a predetermined low pressure differential and to prevent unseating and leakage at high fluid pressure flow velocities.

Other objects and advantages inherent in the invention will be apparent from the following brief description thereof.

For a better understanding of the invention, reference may be had to the following more detailed description and to the accompanying drawings in which:

FIG. 1 is a longitudinal cross-sectional view, showing an illustrative embodiment thereof;

FIG. 2 shows a sectional view and an elevational outline view of the toggle type spring in its pre-formed configuration prior to assembly; and FIG. 3 is a fragmentary view of the proposed invention shown in FIG. 1, with the piston device shown in the opposite extreme position from that shown in FIG. 1.

Referring now to the drawing, a fluid pressure responsive double acting check valve device 1 is shown comprising a central body portion 2 and end cover portions 3 and 4 suitably secured thereto in sealed relation as by gaskets shown. Disposed in a counterbore 5 coaxial with a central bore 6 in one end of the body portion 2 is a valve assembly 7 to which is attached, through the intermediary of a toggle type spring 8, a diaphragm type control piston 9. The control piston 9 is operable in a bore 10 in the opposite end of central body portion 2, the bore 10 being coaxial with bore 6 and separated from it by a partition 11.

End cover portion 3 is provided with a bore 12 coaxial with and of substantially the same diameter as central bore 6 and is further formed with an annular lip which projects axially from the periphery of bore 12 into the opening formed by counterbore 5, said lip serving as a valve seat 13. Formed on central body portion 2 and projecting from the periphery of bore 6 axially into the opening formed by counterbore 5 is a second annular lip serving as a valve seat 14 having axially spaced, parallel relation with valve seat 13. The opening formed by counterbore 5 comprises a delivery chamber from which leads an outlet passage and port 15 in body portion 2 to a piping face 16 where it is adapted to be suitably connected to a conduit leading to a fluid pressure receiving device (not shown). The opening formed within the bore 6 serves as an inlet chamber which is connected by an inlet passage and port 17 in body portion 2 to the piping face 16 and by a passage 18 in partition 11 to a chamber formed within bore 10. Within bore 10 is a second inlet chamber connected via a passage 19 in end cover portion 3 and inlet port and passage 20 in the central body portion 2 to the piping face 16, and by a branch passage 21 in the central body portion 2 and end cover portion 4 to a chamber formed within stepped bore 22 in end cover portion 4.

The valve assembly 7 comprises a double-faced valve element 23 adapted to be secured to a valve stem 24 by a pin 25 inserted transversely through corresponding openings in a central hub 26 of the valve element 23 and the bifurcated end of the valve stem 24. The valve element 23 may be of the standard type wherein the sealing portion is formed by bonding a resilient material such as rubber to opposite faces of a metal guide disc 27, having fluted openings about its periphery, slidably engaging the wall of bore 5. The opposite end of valve stem 24 passes through an O-ring fitted opening in the partition 11 and is provided with a threaded opening axially therein. The valve assembly 7 is adapted to reciprocate axially with the valve element 23 engageable with either of the oppositely facing valve seats 13 and 14, self-alignment of the valve element on either seat being effected by reason of the loose connection between the valve element 23 and the valve stem 24.

Control piston 9 is of the diaphragm type having a diaphragm 28, the outer periphery of which is clamped between the body 2 and end cover 4 to thereby close the openings formed by bores 10 and 22. Thus, control piston 9 is subject to fluid pressure in a chamber on one side thereof from one source of supply via inlet port and passage 17 and passage 18, and on the other side thereof from a separate source of supply fluid pressure via inlet port and passage 20 and branch passage 21. Projecting from control piston 9 into the chamber formed within bore 10 is a follower having an annular skirt 29 thereof adapted to receive the outer ends of toggle spring 8 in an annular groove encircling the inner periphery of said skirt.

Toggle spring 8 is of the leaf type, being formed from a suitably resilient material, such as a spring steel, which may be pre-formed with convolutions intermediate the mid-portion and the ends, as shown in FIG. 2. Spring 8 is secured at its mid-portion to the end of valve stem 24 as by a screw 30 threaded into the bore provided in the end of the stem and is secured at its extremities to control piston 9 by being inserted under compression into the groove provided in skirt 29. The length of the spring 8 is substantially greater in its pre-assembled state than the diameter of the groove in the piston skirt such that the spring is provided with a predetermined initial compression when assembled which results in a resilient axial force urging the valve stem 24 in one or the other direction. If desired, spring 8 may be made in simple flat leaf form, without convolutions, in which case the spring assumes a bowed form on installation and exerts an axial force which is reversed as "dead center" position thereof is passed.

In the absence of fluid under pressure from either of the two separate sources of supply, the valve element 23 will be positioned against either valve seat 13 or 14 depending upon which source of supply last provided the dominant fluid pressure. Assuming this position to be as shown in the drawing, the toggle type spring 8 resiliently urges the control piston 9 and valve assembly 7 in opposite directions so that the valve element 23 is seated on valve seat 13 and control piston 9 is in its extreme rightward position against a stop provided by end cover 4.

When fluid under pressure is restored from one source of supply or from both sources of supply simultaneously, and it is assumed that this single source of supply or that the greater of the two sources of supply is effective in port and passage 17, this same fluid under pressure will be immediately effective in the chamber within bore 10 where it acts on control piston 9. The opposite side of control piston 9 is subject to the lesser fluid pressure which is effective in the chamber formed within bore 22 by way of inlet port and passage 20 and branch passage 21 such that a pressure differential is established across control piston 9. This pressure differential maintains the control piston 9 and valve element 23 in their respective positions as shown in the drawing whereby inlet port and passage 17 communicates with outlet port and passage 15 via bore 6, past valve seat 14 and via bore 5. At the same time, fluid pressure communication between inlet port and passage 20 to outlet port and passage 15 is interrupted by valve element 23 being seated on valve seat 13.

Should the fluid pressure supply in inlet port and passage 17 be subsequently reduced below that of inlet port and passage 20 or should the fluid pressure supply in inlet port and passage 20 be increased above that of inlet port and passage 17, the direction of the differential force across control piston 9 will be consequently reversed. Accordingly, the differential force effects movement of control piston 9 in the direction of partition 11 such that the ends of the toggle spring 8 in the skirt 29 approach "dead center" position or vertical alignment with respect to the midpoint of the toggle type spring 8 secured to the valve stem 24.

As the ends of toggle type spring 8 approach "dead center" position, an increased deformation or bending of the spring occurs to provide an increasing resisting force until a condition of critical instability is reached at "dead center" position. As further movement of the control piston carries the toggle type spring 8 past "dead center," the convolution of the spring is snapped inside out whereby the compression force stored in the spring is suddenly and forcibly reversed to effect an axial snap-acting force sufficient to carry the stem 24 and valve element 23 out of engagement with valve seat 13 and into sealing engagement with valve seat 14. In this position, the control piston skirt portion 29 is stopped against the partition 11 and the toggle spring is inverted as shown in FIG. 3 and functions to position and retain the valve element 23 on valve seat 14 with a predetermined force equal to the initial axial force of the toggle spring. Consequently, flow of supply fluid under pressure from inlet port and passage 17 to delivery via the common outlet port and passage 15 is interrupted and supply fluid under pressure via inlet port and passage 20 is connected from the inlet chamber formed by bore 12 in end cover 3 past valve seat 13 into the delivery chamber formed by counterbore 5 and the common outlet port and passage 15 to delivery. Thus, with each successive change of the dominant fluid pressure from one source of supply to the other, the direction of the pressure differential across control piston 9 suffices to position the valve assembly 7 with a snap-action effect accordingly to direct the appropriate supply fluid pressure to the delivery device (not shown) and the receiving device (not shown) and to isolate the higher source of supply fluid pressure from the lower source of supply fluid pressure with sufficient force to prevent unseating at high flow velocities.

In accordance with the above described operation it should be obvious that if fluid under pressure from the two separate sources (not shown) is supplied at equal intensity to the inlet ports and passages 17 and 20, the force resulting from the initial compression stored in the toggle spring 8 will maintain the control piston 9 and valve assembly 7 in the position effected by the immediately previous dominant fluid pressure.

However, it should also be understood that operation of the valve assembly 7 between valve seats 13 and 14 may be effected quickly and forcibly in response to low pressure differentials due to the snap-action of toggle type spring 8 and to the relatively large area of control piston 9 subject to the opposing supply pressures. Furthermore, the force effecting seating of the valve element on either seat 13 or 14 results from only the initial compression of toggle spring 8, which predetermined force is sufficient to maintain the valve element seated against high fluid pressure flow velocities without damaging the sealing faces of valve element 23 by reason of excessive forces effecting seating thereof on the valve seats.

Therefore, a double check valve device is provided as described having the desirable snap-acting feature applied axially when initiated upon establishment of a low pressure differential between the two sources of supply; and which further provides sufficient flow capacity to its associated operating devices without unseating of the valve element; which offers low-cost construction requiring a minimum of machining; and which may be maintained without removal of the valve body from the piping system and without requiring special tools or knowledge by simply removing the end covers and the screw connection between the toggle spring and valve stem and replacing the internal parts through the exposed openings in the central body portion.

Having now described the invention, what I claim as new and desire to secure the Letters Patent, is:

1. A double check valve device comprising:
 (a) a valve body having formed therein a pair of supply chambers, communicable with separate pressure sources, and a delivery chamber interposed between said pair of supply chambers, (b) a pair of oppositely facing axially spaced valve seats each disposed between said delivery chamber and a corresponding different one of said supply chambers, (c) a valve member operable between and selectively seatable on said valve seats, (d) piston means subject opposingly to the respective fluid pressures in said supply chambers, and (e) toggle spring means connecting said valve member and said piston means, said toggle-spring means holding said valve member in sealing engagement with one or the other of said valve seats and effective in response to a change in direction of fluid pressure differential effective on said piston means to activate said valve member by snap-action from one to the other of said valve seats to thereby isolate the lower supply fluid pressure from the delivery chamber and connect the higher fluid pressure thereto.

2. A double check valve device as claimed in claim 1 and further characterized in that said toggle spring means is attached at its mid-portion to said valve member and at its extremities to said piston means, said toggle spring means being of such length as to require compression thereof to install, whereby an increasing resisting force is created and stored therein as the spring means is moved toward a "dead center" position, which stored force is subsequently released upon movement of said spring means beyond "dead center" position to thereby effect an axially applied snap acting force to said valve member.

3. A double check valve device as claimed in claim 2 and further characterized in that said toggle spring means is preformed in the unstressed shape of said spring from flat resilient stock with convolutions between the midportion and the ends thereof.

4. A double check valve device as claimed in claim 3 and further characterized in that said toggle spring means is of such length prior to assembly as to be under compression when assembled between said valve member and said piston means, thereby causing said valve member to be urged axially into sealing engagement with one or the other of said valve seats with predetermined resilient force.

5. A double check valve device as claimed in claim 4 and further characterized in that said toggle spring means is snapped to an inverted convoluted form consequent upon the compression of said spring increasing in intensity as said piston means moves the ends of said spring past "dead center" position with respect to the midpoint thereof in response to a change in direction of the effective fluid pressure differential on said piston, whereby the force resulting from the increased spring compression is suddenly reversed to effect an axially applied snap-acting movement of said valve member in a direction opposite to the direction of movement of said piston means.

References Cited

UNITED STATES PATENTS

| 1,575,771 | 3/1926 | King | 137—112 |
| 3,101,734 | 8/1963 | Replogle et al. | 137—114 |

NATHAN L. MINTZ, *Primary Examiner.*